United States Patent
Bernhardt

(12) 
(10) Patent No.: US 8,876,519 B2
(45) Date of Patent: Nov. 4, 2014

(54) PROCESS FOR KNOTTING A DOUGH STRAND INTO A DESIRED FORM, ESPECIALLY KNOTTING A DOUGH STRAND INTO A PRETZEL FORM, PLUS RELATED APPARATUS

(75) Inventor: Udo Bernhardt, Iphofen (DE)

(73) Assignee: Fritsch GmbH, Markt Einersheim (DE)

( * ) Notice: Subject to any disclaimer, the term of this patent is extended or adjusted under 35 U.S.C. 154(b) by 0 days.

(21) Appl. No.: 13/468,067

(22) Filed: May 10, 2012

(65) Prior Publication Data

US 2012/0219656 A1 Aug. 30, 2012

Related U.S. Application Data

(62) Division of application No. 12/638,215, filed on Dec. 15, 2009.

(30) Foreign Application Priority Data

Dec. 19, 2008 (DE) .......................... 10 2008 055 020

(51) Int. Cl.
*A23C 3/08* (2006.01)
*A21C 3/08* (2006.01)

(52) U.S. Cl.
CPC ........................................ *A21C 3/08* (2013.01)
USPC ........... 425/323; 425/321; 425/334; 425/391; 425/441; 425/443; 426/499; 426/512; 426/517

(58) Field of Classification Search
CPC ......... A21C 3/08; A21C 9/088; A21C 11/002
USPC ......... 425/323, 334, 391, 125, 319, 320, 321, 425/393, 441, 443; 426/499, 512, 517
See application file for complete search history.

(56) References Cited

U.S. PATENT DOCUMENTS

| | | | | |
|---|---|---|---|---|
| 1,739,892 A | * | 12/1929 | Elliott | 425/323 |
| 1,903,572 A | * | 4/1933 | Schroder | 425/328 |
| 2,053,608 A | * | 9/1936 | Gerland | 425/323 |
| 2,077,993 A | * | 4/1937 | Elliott | 425/323 |
| 2,629,340 A | * | 2/1953 | Allen et al. | 425/323 |
| 2,769,407 A | * | 11/1956 | Allen et al. | 425/154 |
| 3,116,703 A | * | 1/1964 | Enoch et al. | 425/201 |
| 3,315,618 A | * | 4/1967 | Groff | 264/299 |
| 5,009,910 A | * | 4/1991 | Zwicker | 426/499 |
| 5,286,185 A | * | 2/1994 | Tashiro et al. | 425/140 |

(Continued)

FOREIGN PATENT DOCUMENTS

| | | |
|---|---|---|
| DE | 198 26 798 A1 | 12/1999 |
| DE | 203 09 072 U1 | 10/2003 |
| WO | 2005065458 A2 | 7/2005 |

*Primary Examiner* — Seyed Masoud Malekzadeh
(74) *Attorney, Agent, or Firm* — Frank H. Foster; Kremblas & Foster

(57) ABSTRACT

An apparatus for the knotting of a dough strand into a desired form, particularly for the knotting of a dough strand into a pretzel form, wherein the dough strand subject to stretching of the dough strand length is knotted around a form element that provides the desired form for a dough strand with larger starting length than the actual length of the dough strand and/or the desired form with an increased form size, whereupon the form element that establishes the desired form is removed, at least partially, so that the dough strand that was placed into the desired form contracts into a final size.

5 Claims, 6 Drawing Sheets

(56) References Cited

U.S. PATENT DOCUMENTS

| | | |
|---|---|---|
| 5,460,079 A * | 10/1995 | Bartow et al. .................. 99/353 |
| 5,766,663 A * | 6/1998 | Neumann et al. ............. 426/499 |
| 6,036,990 A * | 3/2000 | Shlyakhovsky ............... 426/500 |
| 6,082,988 A * | 7/2000 | Muller et al. .................. 425/363 |
| 6,276,919 B1 * | 8/2001 | Jensen et al. .................. 425/323 |
| 2007/0048423 A1 * | 3/2007 | Bernhardt ..................... 426/499 |

* cited by examiner

PROCESS FOR KNOTTING A DOUGH STRAND INTO A DESIRED FORM, ESPECIALLY KNOTTING A DOUGH STRAND INTO A PRETZEL FORM, PLUS RELATED APPARATUS

BACKGROUND OF THE INVENTION

Dough strands form the starting basis for a plurality of pastry products or dough products, such as for example pretzels. In order that the dough product to be formed attains the desired final form, the dough strand has to be shaped in a certain manner, starting from its original straight form, or knotted into a certain form.

The aim is thereby, even with mechanized manufacture of the corresponding dough products, to form the dough in such a manner or to knot or place it into the desired form that the end product complies as well as possible with the existing quality demands, particularly in optical and aesthetic aspects. Among other things problems can however emerge in this context with more complicated knotted forms such as pretzels. For example one observes frequently that, during mechanized tying procedures, the knot of the, as an end product, shaped pretzel is not as firm or tight as would be desired for a pastry product of optimal quality. Only if the knot is sufficiently tight is it possible to prevent that salt solution penetrates into the knot. During the manual knotting the strand or the final pretzel are manually stretched in order to pull the knot tight and to achieve the final form.

The object of the invention is therefore to specify a process or an apparatus that is improved in regard to this problem and permits especially the formation of optimally knotted dough products.

SUMMARY OF THE INVENTION

In order to achieve this objective a process is provided for, among other things, the knotting of a dough strand into a desired form, particularly for knotting of a dough strand into a pretzel form, characterized in that the dough strand subject to stretching of the dough strand length is knotted around a form element that establishes the desired form for a dough strand with larger starting length than the actual length of the dough strand and/or the desired form with an increased form size, whereupon the form element that establishes the desired form is removed, at least partially, so that the dough strand that was placed into the desired form contracts into a final size.

During the process according to the invention the dough strand is therefore initially placed or knotted around a form or a form element, wherein the form element establishes the desired final form of the pastry product. The form element, which can consist of multiple parts or also can be designed as a single element, baking form-like or as a type of edging, is thereby designed such that only a dough strand of a length that is larger than the actual length of the dough strand to be used can be placed around or into the form without stretching in the desired final form. In this sense the form that is established by the form element is "too large" for the actual dough strand or the form element establishes a form size that is larger than size that is actually desired for the formed dough piece or pastry product. That means that the dough strand to be used, in order that it can be knotted or placed around the form in the desired manner, has to be necessarily stretched in its length or that tension has to be accumulated within it. The form element does of course not have to establish the end form that is to be attained in all its details. Often it is sufficient if a basic form, the desired form in essence or the essential contour of the desired form, is established by the form element.

In this context the knotting (around) of the dough strand around the form element is to be understood in the broadest sense. This concerns in particular the case where a dough strand subject to stretching is placed in an indentation or a type of "baking form" which establishes the desired end form with correspondingly enlarged from size.

Once the dough strand has been placed around the form element or been placed in it in the described manner, the form element is again removed. The form element does thereby not necessarily have to be completely removed, instead it can also be partially removed, particularly in the case when a form element is used that consists of several individually independently movable components, such as for example bolts or pins. As a rule it is however recommended to remove the form element altogether with all of its components. The removal of the form element has to ultimately be achieved in such a way that the dough strand can contract again subject to the decrease of the tension that was accumulated by the stretching process. This means that the dough strand subject to the decrease of the tension that was created by the stretching process attains finally again a smaller final size or a desired nominal size. In this manner, for example, the pretzel that was created by the shaping process is "shrunk" after the removal of the form element so that it attains its actually desired nominal size.

The process of stretching with the subsequent renewed contraction of the dough strand makes it possible to then, for example during the formation of pretzels, tighten the knot of the pretzel as desired so that a final product of optimal quality can be attained.

By means of the form element the desired form can be established for a starting length and/or with a form size which is, at least in essence, 10 to 30% larger than the actual length of the dough strand and/or the desired final size and/or the increases in the length and the breadth can be selected differently, subject to the specification of the desired form with an increased form size. The form size can be determined by means of tests or in the context of a readjustment and/or a calibration procedure.

The form that is established by the form element is thereby implemented in such as way that the dough strand, which would have a length that is about 10 to 30% above the length of the utilized dough strand, could be knotted, without stretching and therefore without buildup of interior tension due to the stretching, around the form or the form element. In this context the specification of 10-30% is merely to be seen as an example for a suitable range in which the length, which is established by the form element, can be above the actual length of the dough strand. Of course distensions can likewise make sense, for example dependent on the type of dough, in an intermediate range, such as from about 20% or 25%. Where appropriate the stretching, which is established by the form, can also be (somewhat) less than 10% or above 30%. It is particularly advantageous and feasible according to the invention to select the form size in such a manner that it establishes, in regard to the desired end form, a different scaling of the size in length and breadth. The form element can, for example, be featured such that, associated with it as compared to, for example, a finished pretzel, the height or length of the pretzel (symmetry axis through the knot) is increased by 30% and the breadth by 20%. The choice of these different increases is dependent, for example, on the dimensions of the dough strand, the cross section, deposition of the ends of the dough strand etc.

For example it is conceivable that the form element, in regard to the size of the tying form which is predetermined by it, is aligned in such a manner that during the knotting around a dough strand with an original length or actual length of 600 mm is stretched to a length of 720 mm, or therefore by about 20%. In this case the form element or the size of the tying form that is established by the form element is to be assessed or calculated in such a manner that, after the removal of the form elements and the following shrinking process of the dough or the contraction of the dough strand, the end product attains the required nominal size. The form element or the corresponding tool that implements the form element are, from the outset, therefore chosen correspondingly larger than would be required for the attainment of the nominal size for a dough strand knotted around without stretching.

This means that a holding bracket (implemented for example through individual elements such as bolts) or a similar form element is dimensioned, from the start, correspondingly larger so that despite the contraction of the dough, during the decrease of the tension that accumulated during the stretching, at the end a dough product with the desired size is obtained.

As a form element a form element can be utilized that features at least one form bolt and/or at least a form pin or a form element can be utilized as a form element that is exclusively implemented with form bolts or form pins and/or a form element can be utilized that implements a holding bracket and or specific holding provisions for holding the dough strand ends in a preferred position and/or the position of at least one component, especially at least one form bolt and/or form pin, can, for purposes of changing the form that is established by the form element, be modified, in particular by means of displacing at least one component in a guiding device and/or by means of transposing at least one component from one into another through passage- and/or mounting aperture.

The complete form, around which the dough strand is placed or knotted, can therefore consist of a plurality of form bolts or also form pins, for example of about 10 to 15 bolts, around which the dough strand is knotted. Subsequently these bolts or also pins can be removed, such as for example by means of lowering into or under a storage plane of the dough strand, in order to make it possible that the dough strand, which was deposited under tension, contracts again and thereby lowers the tension that was created within it.

Where appropriate, the form element can also be implemented from different components, such as, for example, some bolts or also form-like elements or channels into which the dough strand is deposited or suchlike. The or some form bolts can be displaceable, for example in special guidances such as guidance grooves in, for example, the surface of a plate and/or a table element. In addition the bolts can be supported in the plate, the table or in a further plate element expediently disposed underneath, by means of, for example, screwing them in. The plate of the transport table that is situated above it then features openings for the through-passage of the bolts and pins in the upward direction. Longitudinal slots and elongated holes are, for example, particularly suitable as openings, particularly for implementing the displaceability of form bolts in the longitudinal direction that corresponds to the conveying direction of the pastry product that is to be formed. If conveyor belts are present on which the pastry piece is transported, the conveyor belts are expediently partitioned into a plurality of individual conveyors of smaller width so that the slots or guidances and therefore also the bolts disposed therein are placed in the space between the individual conveyors. A lateral displacement can be implemented, for example, by (SIC) of the bolts between individual openings or holes in the plate. In principal guidances are conceivable that feature, for example, an oval or circular form and permit a changing of the arrangement of the bolts in the longitudinal as well as lateral direction. In this case the coordination with the position of the conveyor belts can however be difficult.

In particular a holding bracket can be implemented by means of the form element or, in order to enable the increase of the stretching or the tension within the dough strand, there can be provided, for the ends of the dough strand, specific holding provisions, which, for example, (more or less) firmly join the ends with a central part of the dough strand during the process of forming the pretzel in a form designated for the final product, so that the basic pretzel form is preserved despite the accumulated tension in the dough strand and the ends especially cannot come loose. The holding provisions for one end or both ends of the dough strand can be implemented, for example, in a clamping manner in order to, where appropriate, even make the stretching of the dough strand possible, or a corresponding pressure, which prevents the extraction of the strand, can be exerted on a upper side of the dough strand in an area in which the dough end is positioned after the forming of the end product, or suchlike.

At least one form bolt and/or form pin can be removed by means of extraction or retraction. In particular a removal by means of a manual or automatic extraction or retraction is possible. Furthermore at least one form bolt and/or form pin can be disposed with the aid of at least one table and/or plate element.

It is therefore conceivable that the dough strand ist knotted around a series of bolts or pins that are subsequently and preferably automatically lowered or retracted (for example in relation to the plane in which the dough strand is stored), so that the stretched dough strand contracts again subject to the decrease of the tension accumulated within it. In this context a pulling away or extraction of all bolts or pins or form components is not necessarily required. Where appropriate it may also be sufficient to remove some of these elements, manually or automatically, so that the dough strand can contract again longitudinally. Usually it will however be advantageous to completely remove the form elements or bolts or pins in order that they present no obstacle for, for example, the further conveyance of the finished formed dough piece. For purposes of holding or fixating the individual components of the form element a plate-like element can, for example, be provided, onto which the bolts and such are bolted or on which or with the aid of which they are, by other means, frictionally and/or positively attached.

In the context of the process the dough strand can be knotted into or around a pretzel form so that by means of the removal of the form element the dough strand and the knot of the pretzel are drawn together for the implementation of a tight knot.

In this manner it is possible, with the process according to the invention, to implement pretzels with very tight knots that especially satisfy the quality demands for such a pastry piece so that in particular it is prevented that salt solution penetrates into the knot. By means of the process according to the invention, as part of which the dough strand is initially held subject to stretching, the knot ties itself tighter in the end product; a contraction is initiated during the tension release in the dough strand subsequent to the removal of the form element. In the process the remaining strand is of course shortened also, wherein however, as mentioned, particularly the positive effect on the knot is of an advantage. Ultimately the tension consolidates by these means the knot that was already implemented during the knotting-around process.

The type of dough of the dough strand can, depending on their tension characteristics, and/or the enlarged form size can, depending on the type of dough of the dough strand and/or the characteristics of the dough strand and/or the final size and/or the desired shape, be selected. This means that, depending on the firmness or the appearance of the knot to be implemented during the shaping of a pretzel or other desired characteristics of the final dough product, a suitable type of dough can be selected. Of course the type of dough is usually not only selected depending on its tension characteristics that are of importance for the stretching and the subsequent renewed contraction, but other demands will have to be placed on the type of dough, among other things in regard to the characteristics that the final product should exhibit, for example regarding the firmness, the taste and the surface implementation. Correspondingly, where a desired form size is specified, the increase is, for example, directly dependent on the selected type of dough so that, for example, depending on the type of dough, cross section of the strand and other characteristics such as the texture of the dough, the degree of the size increase is different or differences in the size increase in different dimensions or direction are provided.

The dough strand can be transported to the form element by means of at least one transport installation, particularly a conveyor belt installation, and/or be taken away in the desired form after the removal of the form element, particularly to an installation for further processing.

It is therefore possible that the dough strand is disposed on, for example, a transport installation, for example on a conveyor belt, on which it is transported to the place or the position that is provided for the knotting around the form element. For example it is conceivable that the conveyor belt installation features, for this purpose, individual conveyors that are arranged at a certain distance and between which, from below, form bolts or form pins can penetrate in an upward direction, around which then, by means of suitable (gripping- or positioning-) tools, preferably automatically, the dough strand is knotted in the desired form in order to, for example, implement a pretzel as a final end product.

If then these bolts, that were moved in an upward direction through the spaces of the conveyor belt installation, are again retracted downward, or therefore below the plane of storage of the dough strand, then as a result the tension in the dough strand is again released. The strand contracts and becomes a dough element with the desired nominal size.

With the aid of a conveyor belt installation the end product, which is to be further processed, such as within the context of a baking process, or that is to be sprinkled with salt or flour or suchlike, can be conveyed to the next location of further processing.

Beyond that the invention concerns an apparatus that is implemented for the knotting of a dough strand into a desired form, particularly according to a process as described above and/or for knotting of a dough strand into a pretzel form, wherein the apparatus is characterized in that it features a form element that specifies the desired form for a dough strand with larger starting length than the actual length of the dough strand and/or a form element that specifies the desired form with an increased form size, around which the dough strand subject to stretching of the dough strand length can be knotted and that is subsequently removable, at least partially, so that the dough strand that was placed into the desired form contracts into a final size.

The apparatus therefore exhibits at least one form element around which the dough strand, which is too short to encompass the form element without stretching of its starting length, is knotted around or in which the dough strand is placed subject to stretching of its length or suchlike. The form element is subsequently removed again or the dough strand is removed from it so that it contracts again subject to the decrease of the tension accumulated within it or contracts into a desired nominal size.

The desired form that is established by means of the form element can be a form for a starting length and/or with a form size, which, at least in essence, is 10 to 30% larger than the actual length of the dough strand and/or the desired final size and/or the increases in the length and the breadth can be selected differently, subject to the provision of the desired form with an increased form size. The form element of the apparatus is therefore implemented in such a way that a dough strand that is 10-30% or of a similar magnitude longer than this corresponds to the actual length of the utilized dough strand, could, without stretching of its length, be placed around or knotted or be placed in it. Such a strand can, for example, be stretched from 600 mm length to 720 mm, therefore by 20%. The increases in size, subject to the specification of the form size, regarding the desired final form, for example that of a pretzel, can be different in length and breadth. The ideal or optimal form size can be determined by means of tests or in the context of a recalibration.

The form element can feature at least one form bolt and/or at least a form pin or a form element can be utilized as a form element that is exclusively implemented with form bolts or form pins and/or a form element can be utilized that implements a holding bracket and or specific holding provisions for holding the dough strand ends in a preferred position and/or the position of at least one component, especially at least one form bolt and/or form pin, can, for purposes of changing the form that is established by the form element, be modified, in particular by means of displacing at least one component in a guiding device and/or by means of transposing at least on component from one into another through passage- and/or mounting aperture.

The apparatus therefore exhibits usually a form element that is implemented from several individual components, for example a plurality of bolts or pins. Furthermore it is advantageous if, in order to even enable the accumulation of tension in the dough strand, holding provisions for the strand ends are provided that retain or fixate it in the desired position, if necessary relative to the rest of the dough strand, so that the length increase of the strand is possible during the shaping of it without problems. In order to modify the form that is predetermined by the form element, single or all of the components such as bolts or pins can be supported so as to permit, for example, longitudinal or lateral movement.

At least one form bolt and/or form pin of the apparatus can be removable by means of extraction or retraction, particularly by means of manual or automatic extraction or retraction and/or it can be disposed at least one form bolt and/or form pin with the aid of at least one table- and/or plate element.

In this context it is particularly conceivable that such bolts penetrate through a surface on which the dough strand is situated or are extended into it, such as, for example, through holes or recesses disposed for this purpose in a transport table or a transport plate and/or in spaces of conveyor belts or suchlike in order to be subsequently lowered again after the dough strand was placed, subject to tension, around the bolts or pins. After the removal of the form element the tension in the dough strand releases again and the completely formed dough element can attain, subject to a shortening of the strand length, its final size. The bolts and/or pins can be mounted with the aid of plate-like elements and, if appropriate, penetrate through a plate, which is disposed above it, of a transport installation.

The apparatus can, in particular, be implemented in such a way that the dough strand can be knotted, by means of the form element, into a pretzel form so that, by means of the removal of the form element, the dough strand and the knot of the pretzel can be drawn together for the purposes of implementing a tight knot. This should be one of the most important applications of the process according to the invention and the apparatus according to the invention, namely that, by means of the form element, a pretzel form is established, wherein then through the release of the tension within the strand during the contraction a particularly elegant and tight knot is implemented.

The type of dough of the dough strand can be selectable in the context of the apparatus according to the invention, depending on its tension characteristics. Besides that additional characteristics can of course be the deciding factor for the choice of the type of dough. By means of the appropriate choice of the type of dough an even tighter knot can, if necessary, be achieved in a pretzel. Furthermore the increased form size can be selectable depending on the type of dough of the dough strand and/or the characteristics of the dough strand and/or the final size and/or the desired form.

Furthermore the apparatus can feature at least one transport installation, particularly a conveyor belt installation which is implemented for the purpose of transport of the dough strand to the form element and/or for the conveying away of the dough strand that has been placed in the desired form subsequent to the removal of the form element, in particular for the conveying away to an installation for further processing. The installation for further processing can thereby also be part of the apparatus. For example this can be in regard to a table that has access to appropriate tools in order to provide the dough strand with, for example, salt and suchlike. If appropriate this can also concern an installation for further processing for the baking of the dough strand. Typical steps in the further processing of pretzels are the cooking, stiffening, leaching, and finally the freezing or subsequently or directly the baking of the pretzel.

BRIEF DESCRIPTION OF THE VIEWS OF THE DRAWINGS

Additional advantages, characteristics, and details appear from the following embodiments as well as from the drawings. The drawings show.

Figure 1:
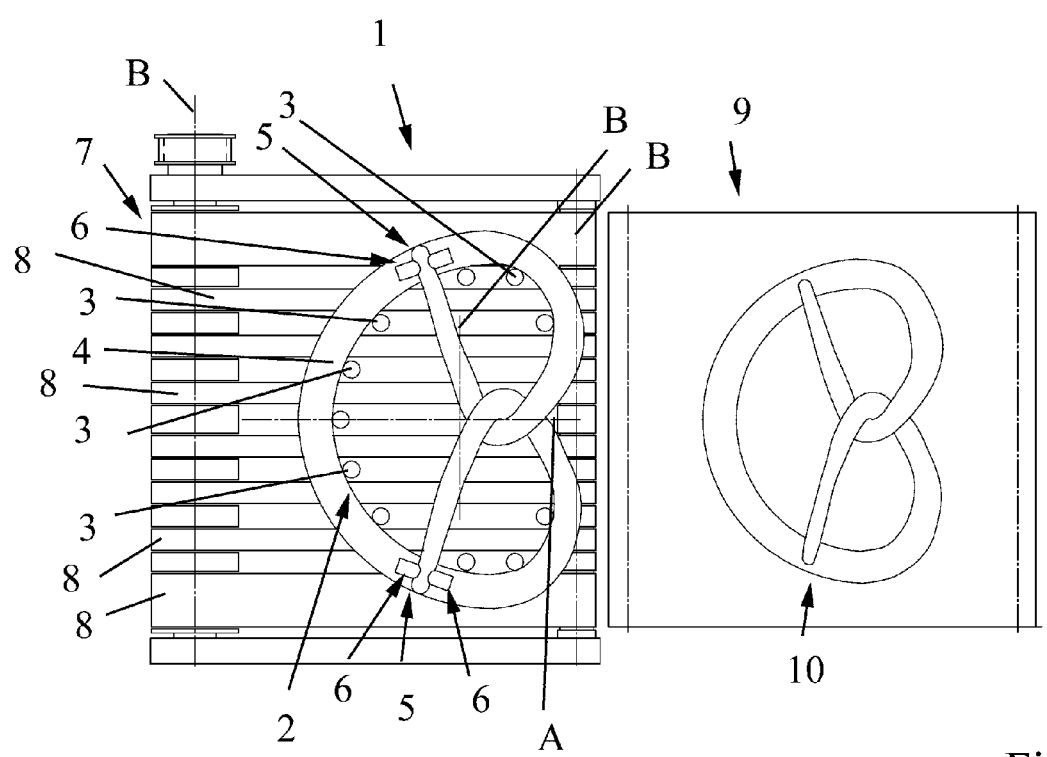
FIG. 1 An illustration of the implementation of a process according to the invention with an apparatus according to the invention, FIG. 2 a dough strand knotted into a pretzel form according to a process according to the invention, directly after the removal of the form element, FIG. 3 an apparatus according to the invention for the purpose of knotting a dough strand into a desired form, FIG. 4 the transport table element, equipped with guidance devices and through-passage apertures for the form bolts, of the apparatus according to the invention of FIG. 3, FIG. 5 the plate element, for the purposes of supporting the mounting of the form bolts, of the apparatus of FIGS. 3 and 4 with view of the form bolts and FIG. 6 the plate element of FIG. 5 in a view from below.

In the drawings identical reference symbols are used for the same or similar elements for reasons of a simplified illustration. Different axes of the apparatus and their components or axes that are of importance for the process of knotting the dough strand into the desired form are labeled uniformly in the figures with the reference symbol "A" insofar as they are positioned in the movement direction of a conveyor belt installation for the pretzel transport. Axes vertical to the movement direction are uniformly labeled with the reference symbol "B".

DETAILED DESCRIPTION OF THE PREFERRED EMBODIMENT OF THE INVENTION

FIG. 1 shows an illustration of the execution of a process according to the invention with the apparatus 1 according to the invention for the purposes of knotting a dough strand into a desired form. The apparatus 1 features a form element 2 which in this case is implemented by means of a plurality of form bolts 3 around which the dough strand 4 is placed in the form of a pretzel.

The form bolts 3 are thereby disposed in such a way that in this embodiment example a dough strand, which would be 20 cm longer than would originally be the case in a dough strand that was actually used, could be knotted without length extension around form bolt 3 in order to implement a pretzel form. Since the actually used dough strand 4 is however shorter, tension is accumulated within it due to the length extension. In order to hold the ends 5 of the dough strand in a firm position relative to a central part of the dough strand 4, so that ultimately the desired pretzel form is created, holding provisions 6 of the apparatus 1 are provided for the ends 5 by means of which the dough strand 4 is ultimately held in the desired tension position.

The dough strand 4 is positioned in the embodiment example shown here on a transport installation 7 in the context of which individual spaced conveyor belt areas 8 are provided that feature such a distance to one another that in the intermediate spaces the form pins or form bolts 3 can penetrate upward from below through the plane of the individual conveyor belt segments or areas 8 in order to subsequently be removed again through automatic lowering so that the dough strand 4 can contract subject to the decrease of the tension accumulated within it. By means of the transport installation 7 the further conveyance of the completely formed dough strand 4 is furthermore possible for purposes of further processing. For example the further conveyance can occur in the direction of an additional conveyor table 9 on which then the completely formed dough products, in this case pretzels 10, are further processed, for example by cooking, stiffening, leaching, freezing or further conveyance to a baking installation, through sprinkling with salt and suchlike. The pretzels 10 feature as end products the originally designated size or nominal size for the final product. The contracting or drawing together of the dough strand from its stretched length to the final length is therefore already considered in the corresponding choice of the form element 2 or the position and the spacing of the individual form bolts 3, so that ultimately the end product that is formed by the knotting process features the correct or desired size after the contraction or drawing together.

Figure 2:
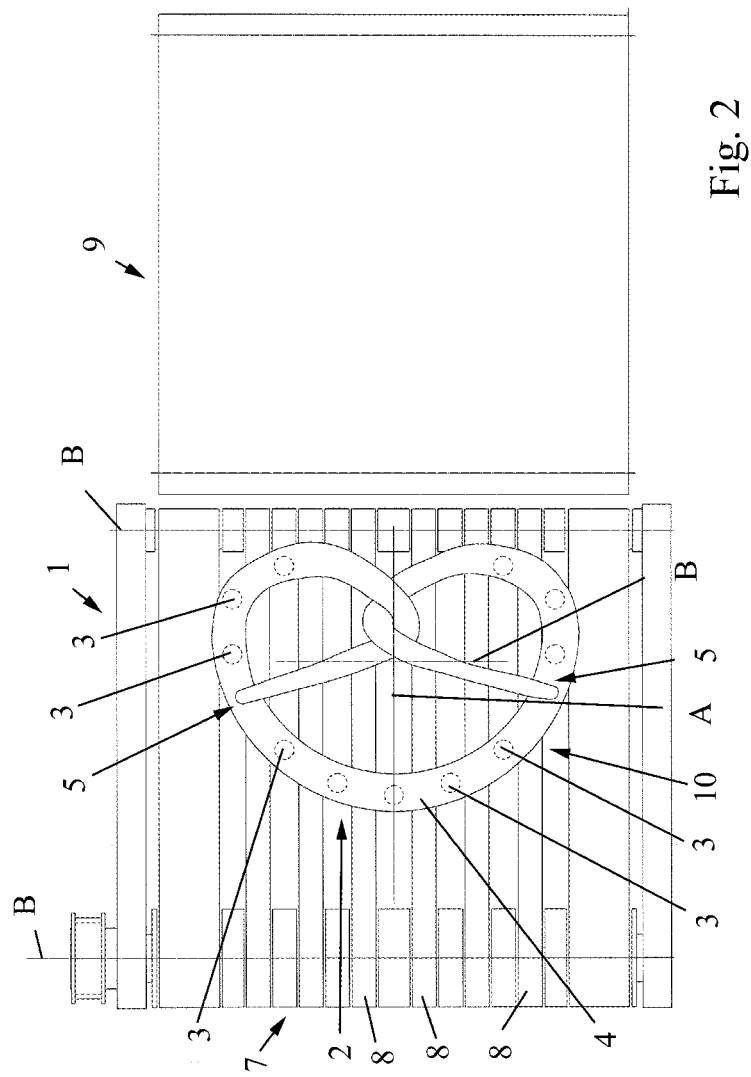

FIG. 2 shows a dough strand 4 knotted into a pretzel form according to a process according to the invention, directly after the removal of the form element 2. The dough strand is, as can be recognized, already contracted or has shortened itself so that the lowered form bolts 3, which here are drawn with dotted lines as elements that cannot be seen from above, are no longer positioned in an interior area in reference to the dough strand 4, but are disposed below the (central part of the) dough strand 4. The holding provisions 6 of the apparatus 1 are also removed since these are, after the decrease of the tension, no longer required in order to maintain the ends 5 of the dough strand 4 in their position.

Thereby the optimal shaping of a desired knot shape, particularly a knot of a pretzel 10, can be made possible with the apparatus 1 according to the invention or the process according to the invention subject to the buildup of tension in the dough strand. The knotting process performed subject to tension, in the case of appropriate dimensioning of the form element 2 or the individual components of the form element 2, results in the condition that, as end products, pretzels 10 are obtained that not only correspond to the nominal size but beyond that feature a particularly tight and firm knot.

Figure 3:
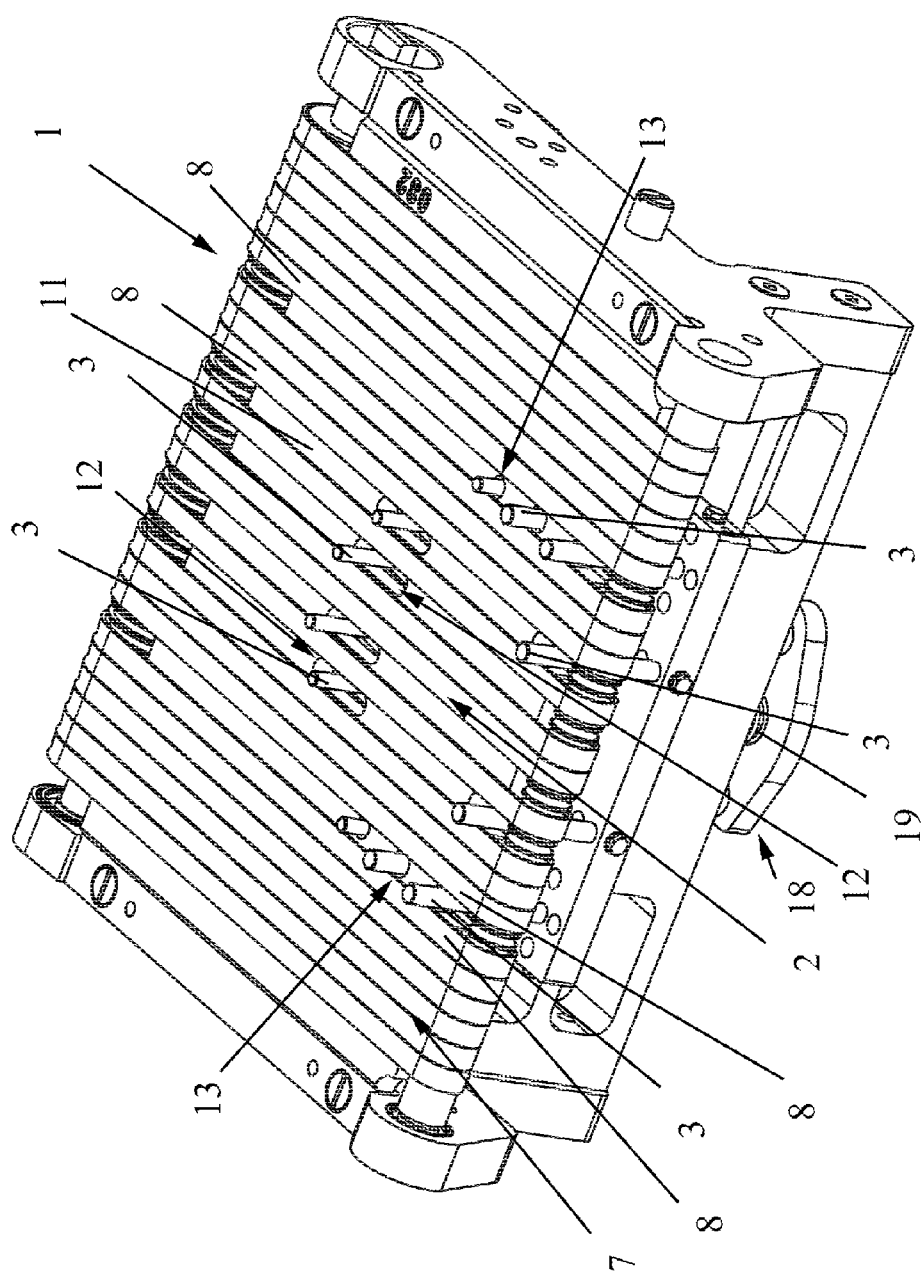

FIG. 3 shows a additional view of the apparatus 1 according to the invention for the knotting of the dough strand into the desired form with a form element 2, by means of which a pretzel form is established. Components of the form elements 2 are a plurality of form bolts 3 that penetrate, in the spaces between the conveyor belt areas 8, in an upward direction through a plate-shaped transport table element 11 of transport installation 7. For this purpose the transport table element 11 features guidance devices 12 and through-passage apertures 13 through which the form bolts 3 can be guided.

Figure 4:
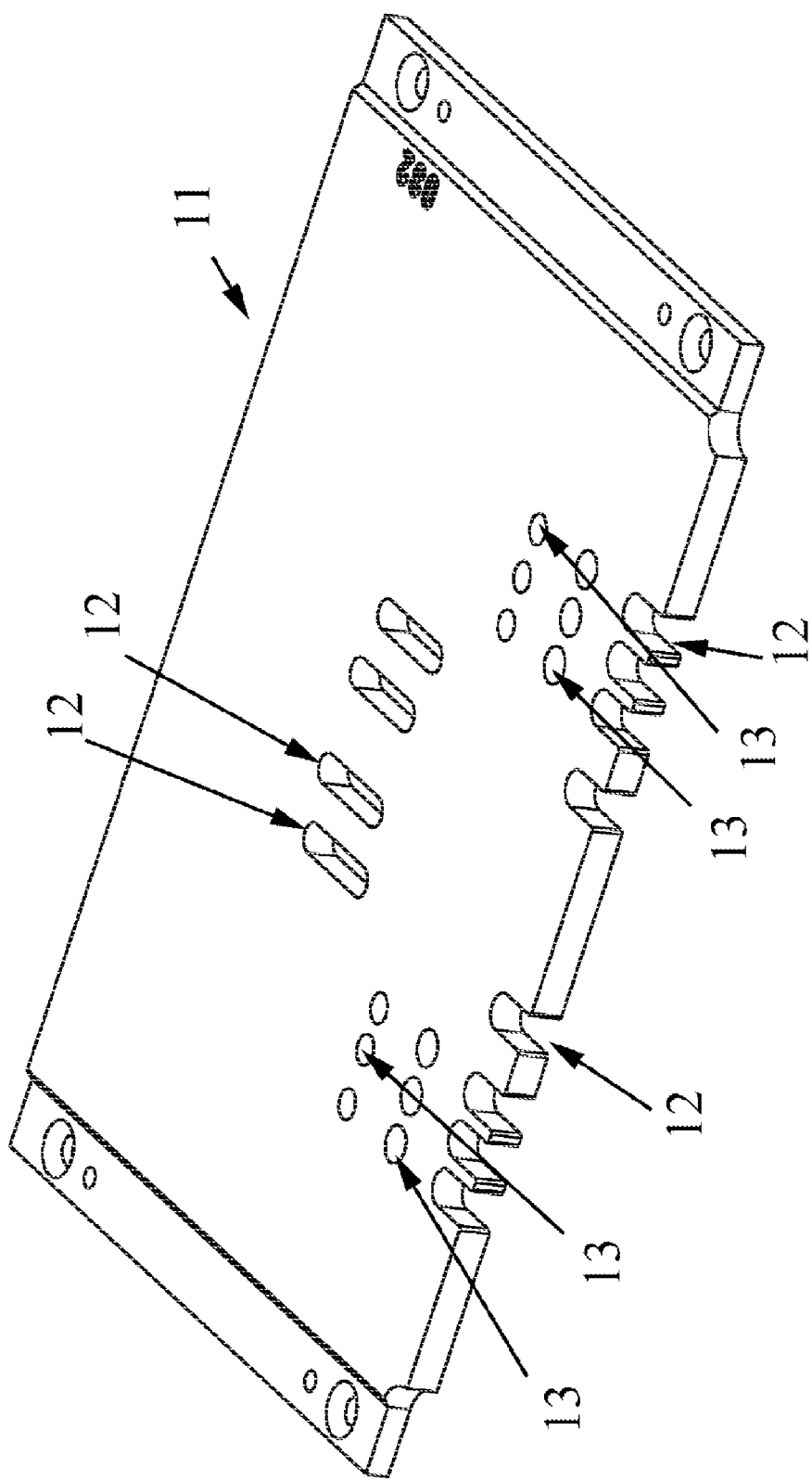

FIG. 4 shows an illustration of the transport table element 11, which is equipped with guidance devices 12 and through-passage apertures 13 for the form bolts 3, of the apparatus 1 of the FIG. 3. In this illustration it can be recognized that the guidance devices 12 of the transport table element 11 run in the direction of conveyance, i.e. parallel to the conveyor belt areas 8 or longitudinally. The through-passage apertures 13 are respectively disposed in groups, in the case of which several, in this case respectively three, of these through-passage apertures 13 are positioned next to each other in the lateral direction of the transport table element 11 (vertically to the direction of conveyance). In this manner a longitudinal or lateral movement of the form bolts 3 is made possible.

Figure 5:
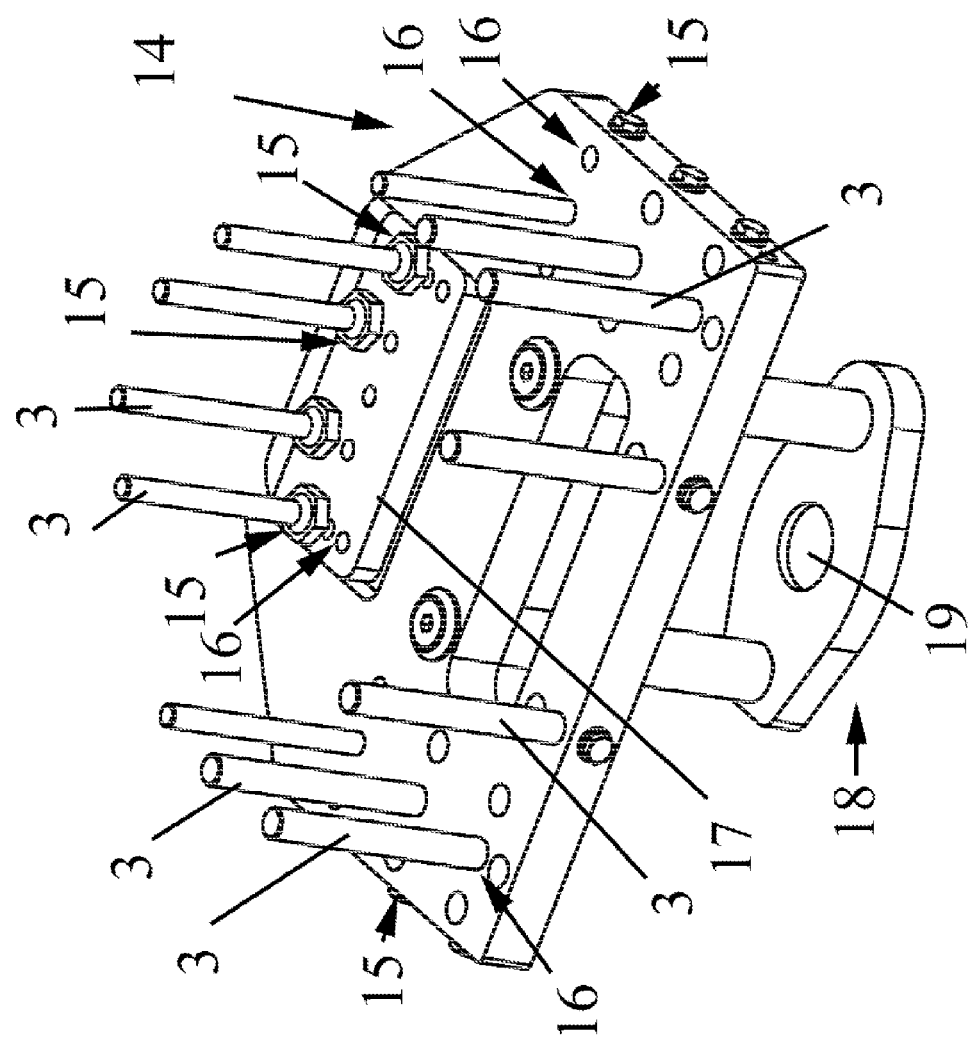
Figure 6:
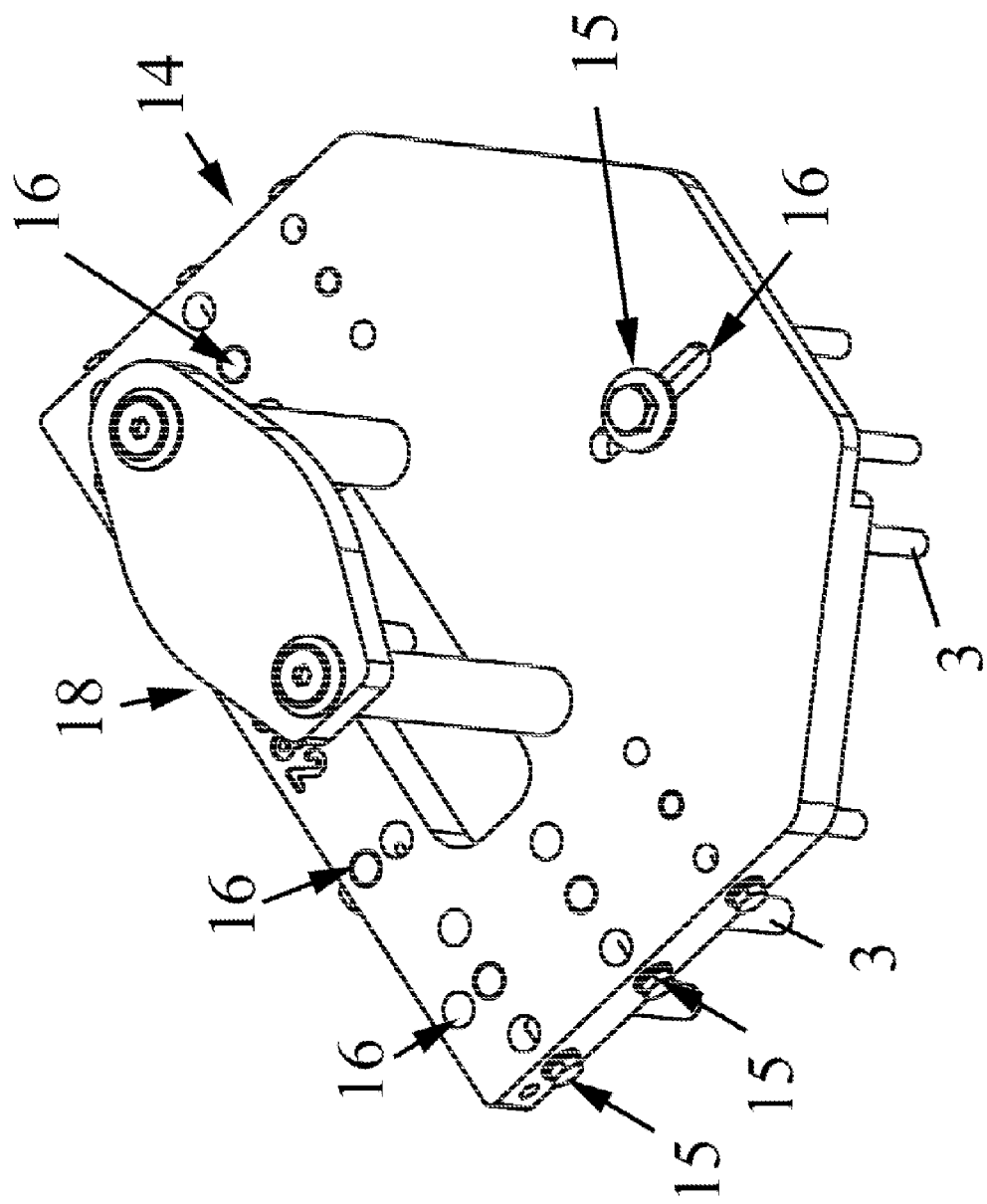

In FIG. 5 the plate element 14, of the apparatus 1 of FIGS. 3 and 4 with view of the form bolts 3 and whose purpose is to support the mounting of the form bolts 3, is illustrated. In FIG. 6 the plate element of FIG. 5 is seen in a view from below.

With the aid of different attachment means 15, such as nuts and screw elements, the form bolts 3 are attached in the mounting apertures and/or guidance devices 16. The mounting can be accomplished directly at the plate element 14 or also indirectly, for example by means of an additional plate element 17, as illustrated here. The heating iron-shaped element 18 features a recess 19 which can receive the end of a spring, which is not shown here and which serves to provide appropriate bearing support.

LIST OF REFERENCE SYMBOLS

1 An apparatus for the purpose of knotting a dough strand into a desired form
2 Form element
3 Form bolt
4 Dough strand
5 Ends of the dough strand
6 Holding provision
7 Transport installation
8 Conveyor belt area
9 Conveyor table
10 Pretzel
11 Transport table element
12 Guidance device
13 Through-passage apertures
14 Plate element
15 Attachment means
16 Holding aperture and/or guidance device
17 Additional plate element
18 Heating iron-shaped element
19 Recess
A, B Axes

The invention claimed is:

1. An apparatus (1) for knotting, by a tying process, a dough strand (4) into a predetermined form including into a pretzel form, the dough strand having been stretched to an increased starting length compared to an original length, the apparatus comprising:
 (a) a transport installation (7) having a supporting surface for supporting the dough strand, the supporting surface extending in both a longitudinal direction and a lateral direction, the transport installation having intermediate spaces through the supporting surface;
 (b) a form element (2) having a base plate or table on which are disposed several form components including bolts or pins (3), the form element being movable toward the transport installation for moving the form components into penetration through intermediate spaces of the transport installation for implementing a form for the dough strand and retaining the dough strand in a predetermined position on the transport installation, the form element being adapted so that the dough strand (4) is configured to be tied around the form components of the form element (2) while the dough strand (2) is stretched in length, the form element also being movable away from the transport installation to remove the form components at least partially away from penetration through the transport installation after completion of the tying process so that the dough strand (4) that has been brought into the predetermined form, contracts to a final size, the form components configured to be individually independently movable in the longitudinal and lateral direction in a plurality of guidances at a surface of the base plate or table or from one respective guidance into another respective guidance through a passage or mounting aperture so that, for a purpose of changing the form for the dough strand established by the form components, a position of at least one form component of the form element is individually independently changeable.

2. Apparatus (1) according to claim 1, characterized in that the form for the dough strand that is established by form components of the form element is a configuration for a starting length which is 10 to 30% larger than an actual length of the dough strand (4) or than a predetermined final size so that increases in a length and a breadth are differently selectable, subject to specification of the predetermined form with an increased form size.

3. Apparatus (1) according to claim 1, characterized in that at least one form bolt or form pin (3) of the apparatus (1) is supported by the table or a plate element and is removable by extraction or retraction from the dough strand by lowering the table or plate element.

4. Apparatus (1) according to claim 3, characterized in that the dough strand (4) is configured to be tied, by use of the form element (2), into a pretzel form so that, by removal of the form element (2), the dough strand (4) and the knot of the pretzel (10) are drawn together for a purpose of implementing a knot.

5. Apparatus (1) according to claim 4, characterized in that the transport installation (7) includes at least one conveyor belt installation which is implemented for a purpose of transport of the dough strand (4) to the form element (2) and for conveying away of the dough strand (4) that has been placed in the predetermined form subsequent to the removal of the form element (2).

\* \* \* \* \*